(No Model.)
S. WILCOX.
FRICTION GEAR.
No. 312,780. Patented Feb. 24, 1885.
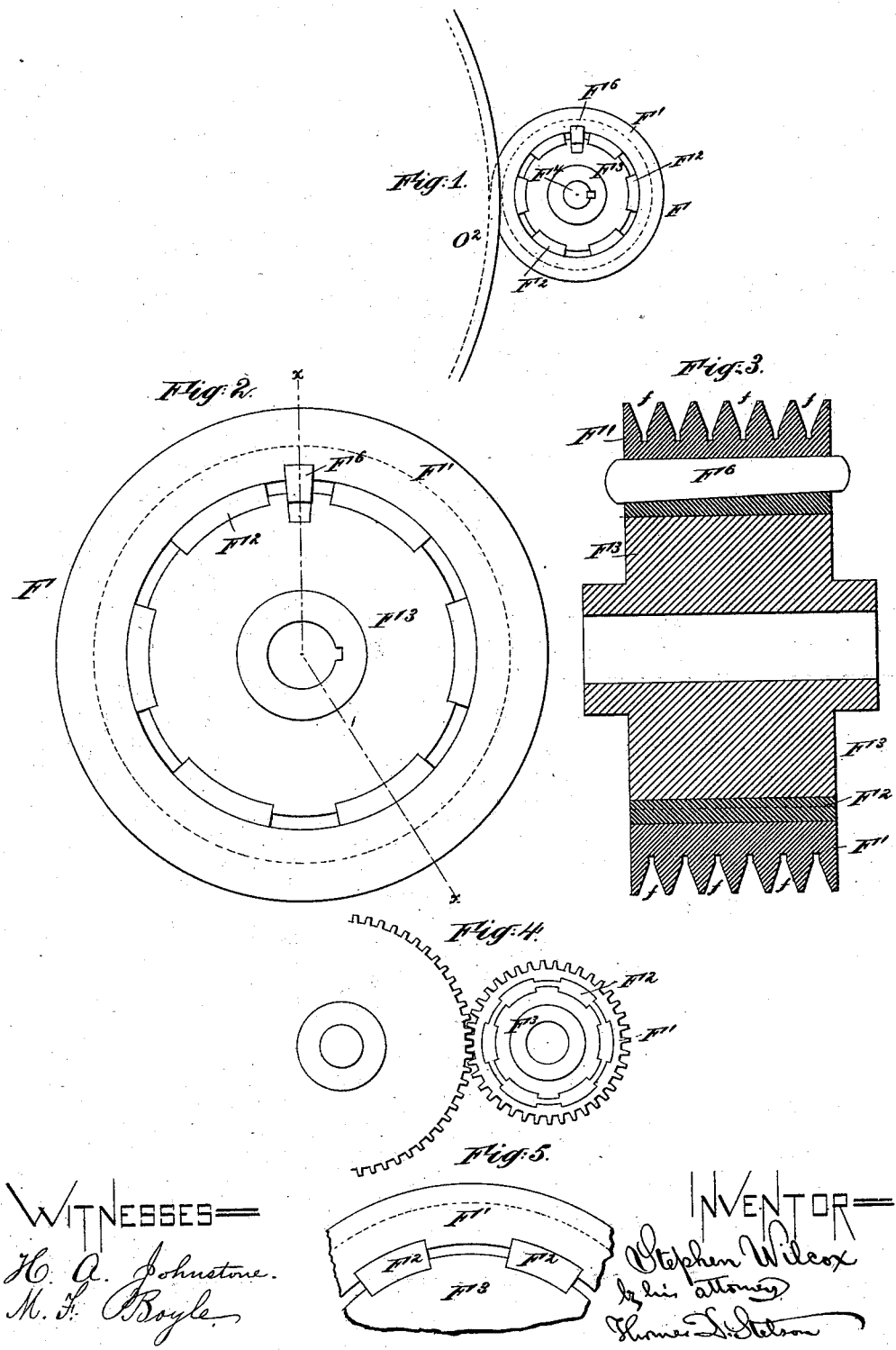

UNITED STATES PATENT OFFICE.

STEPHEN WILCOX, OF BROOKLYN, NEW YORK.

FRICTION-GEAR.

SPECIFICATION forming part of Letters Patent No. 312,780, dated February 24, 1885.

Application filed October 25, 1883. (No model.)

*To all whom it may concern:*

Be it known that I, STEPHEN WILCOX, of Brooklyn, in the county of Kings and State of New York, doing business in New York city, same State, have invented certain new and useful Improvements in Friction-Gear, of which the following is a specification.

It has long been common to turn or otherwise shape the peripheries of wheels with grooves of V-shaped section, and to allow the ridges in one wheel to match into the grooves between the ridges on the adjacent wheel, care being taken to make the widths of the grooves, and consequently the distance apart of the ridges, exactly corresponding in one wheel to that of another. Wheels thus constructed, especially with the bottom of the V-shaped ridges a little deepened or enlarged, so as to avoid "bottoming," act on each other with sufficient force when properly pressed together to transmit a large amount of power. Friction-gear is adapted to work silently and efficiently with the wheels rotating at high velocities. There is an important difficulty in connection with such gearing. Perfect parallelism of two or more shafts is exceedingly difficult to maintain in heavy machinery with solid foundations; but in elastic structures, like buildings and vessels, the difficulty is greatly increased. It is impossible, except by accident, to adjust the parts with perfect accuracy and to keep them so. I remedy this evil by introducing a series of blocks or a continuous ring or zone of wood, india-rubber, or analogous elastic material in one or both the wheels which are engaged together. A small quantity of elastic material thus introduced may serve efficiently; but I prefer a liberal quantity and will so describe it. The yielding of this elastic zone allows the grooved peripheries of the wheels to engage properly and to transmit the force from one wheel to the other while one or both peripheries are out of the position which they would naturally assume on their respective wheels if left free, the displacement being caused by the engagement with the opposite wheel, and being allowed by the elastic condition of the zone.

The tremulous motion which is liable to be engendered in the wheels and adjacent parts by the action of the friction-gear or other gear is greatly reduced by the yielding of the elastic zone.

An important part of the advantages of the invention may be realized if only a sufficient amount of elasticity is involved in what I have termed the "zone" to prevent the trembling. I can attain such moderate amount of elasticity by using wood in place of the rubber or other elastic material.

The accompanying drawings form a part of this specification, and represent what I consider the best means of carrying out the invention.

Figure 1 is an elevation of a friction-pinion or jack-wheel with a portion of the adjacent main wheel with which it is engaged. Fig. 2 is a side elevation on a larger scale. Fig. 3 is a central section on the line $x$ $x$ in Fig. 2. Fig. 4 shows the invention, on a small scale, as applied to toothed gear. Fig. 5 shows a modification in the construction.

I have shown in the drawings the elastic material, as wood, placed with the grain running radially.

Instead of making a continuous zone of elastic material, I have distributed blocks of wood at equidistant points in the spaces between the hub and the rim, and I have recessed the exterior of the hub and the interior of the rim opposite those points where the masses of wood are to be received. This allows the wood to more effectually transmit a strong force in communicating power from one wheel to the next.

The locking or engagement of the elastic material with the parts to allow the transmission of a strong force is obviously important. I can attain this end by a key of metal engaging loosely in the rim, or in the hub, or both; but these parts must be so arranged that the hub cannot by any ordinary or extraordinary strain be caused to turn around without compelling the rim to go with it. In the forms of the invention shown in Figs. 4 and 5 this locking of the parts is attained by the elastic material itself. In the form of the invention shown in Fig. 2 it is attained by an additional key, $F^6$, which may be of iron or steel. The looseness of the fit allows a rigid key to be employed, and allows the necessary yielding by a movement of the key relatively to the part with which it engages.

Similar letters of reference indicate corresponding parts in all the figures where they occur.

F is a jack-wheel, certain portions being further designated, when necessary, by additional letters of reference, as $F'$ $F^2$. $F'$ is an iron periphery equipped with V-shaped ridges $f$. There are corresponding V-shaped grooves in the fly-wheel or main wheel $O^2$; but instead of the whole jack-wheel being rigid and mounted fixedly upon the shaft $F^4$, the force is communicated through blocks $F^2$, of wood or other elastic material, as vulcanized india-rubber, which is mounted between the hub $F^3$ and the annular rim $F'$. This zone or mass or series of masses of elastic material by yielding avoids the trembling due to ordinary friction-gear. It also allows the shafts to be slightly out of their true positions without inducing mischief. A false position is accommodated by the yielding of the elastic portion $F^2$. The power is supposed to be communicated through a steam-engine or other motor acting upon a fly-wheel, a portion of which is represented by $O^2$.

Modifications may be made in the forms and proportions. I can make the grooves wider or narrower, or give a different inclination to the sides, so as to give a different V shape to the section, care being taken to give the same inclination to the grooves $f$ in each wheel. I can make the ridged rim F thicker or thinner or wider or narrower than shown. The elastic material $F^2$ may be thicker or thinner than shown. The hub $F^3$ may be of greater or less diameter and width.

I believe the invention may be used with success with nicely-cut toothed gear, or even on rough toothed gear made either plain or stepped.

My experiments have been with friction-gear, and I propose to apply the invention mainly to such.

By reason of the friction-gear-wheel rim $F'$ and of the wood $F^2$, or other elastic material interposed between said rim and the central hub $F^3$, I am able to allow the rapid rolling action of the parts and the trembling thereof, due to such action, without producing noise or objectionable vibration of the other portions of the mechanism. I am also thereby enabled to allow the axes of the wheels to be held nearer together or farther apart than would be otherwise expedient, the yielding of the elastic material $F^2$ accommodating the movements and maintaining an approximation to the desired position of the peripheries. I am also thereby enabled to allow shafts and the hubs or centers of wheels to change their position endwise to small extents without mischief, and also to allow wheels to work successfully with the axes out of parallel positions.

I am aware that a thin stratum of soft rubber has been clamped between a two-part hub and the periphery of a cog-wheel to deaden sound; but it is evident that such a device would not serve the purpose of this invention, and that any considerable power applied to one part and resistance to the other part would cause the parts to move upon each other. In my invention the blocks $F^2$ do not form a continuous zone, and are of hard material capable of withstanding the strain.

What I claim is—

1. The combination, with the solid metal periphery F and the solid hub $F^3$, of the section-blocks $F^2$ of hard rubber or wood, arranged equidistantly between the parts and adapted to serve as set forth.

2. The gear described, consisting of the solid parts $F'$ $F^3$, the section-blocks $F^2$, arranged between said parts, and the locking-key $F^6$, all combined and adapted to serve with shaft $F^4$ and a fellow gear, as $O^2$, as set forth.

In testimony whereof I have hereunto set my hand, at New York city, New York, this 7th day of September, 1883, in the presence of two subscribing witnesses.

STEPHEN WILCOX.

Witnesses:
CHARLES R. SEARLE,
WM. C. DEY.